United States Patent [19]

Dubay

[11] Patent Number: 4,721,833
[45] Date of Patent: Jan. 26, 1988

[54] RETRIEVABLE ELECTRIC CORD REEL

[76] Inventor: Frank X. Dubay, 5515 Ridgewood Cove, Mound, Minn. 55364

[21] Appl. No.: 798,732

[22] Filed: Nov. 15, 1985

[51] Int. Cl.$^4$ .................. H02G 11/02; B65H 75/00
[52] U.S. Cl. .................. 191/12.4; 191/12.2 A; 242/54 R; 242/85
[58] Field of Search ............ 191/12.2 R, 12.2 A, 191/12.4; 242/54 R, 84.1 A, 85, 100, 106

[56] References Cited

U.S. PATENT DOCUMENTS

| | | | |
|---|---|---|---|
| 2,487,395 | 11/1949 | Strang | 191/12.2 R |
| 3,542,172 | 11/1970 | Meletti | 191/12.2 R |
| 3,561,695 | 2/1971 | Wood, Jr. | 242/84.1 A |
| 3,619,518 | 11/1971 | Blanch et al. | 191/12.2 R |
| 3,808,382 | 4/1974 | Blanch et al. | 191/12.2 R |
| 3,826,879 | 7/1974 | Penn et al. | 191/12.2 R X |

*Primary Examiner*—Stuart S. Levy
*Assistant Examiner*—David Werner
*Attorney, Agent, or Firm*—Merchant, Gould, Smith, Edell, Welter & Schmidt

[57] ABSTRACT

A retractable electric cord reel is disclosed having a base, a rotatable reel on said base and a drive motor disposed in the hub of said reel.

12 Claims, 5 Drawing Figures

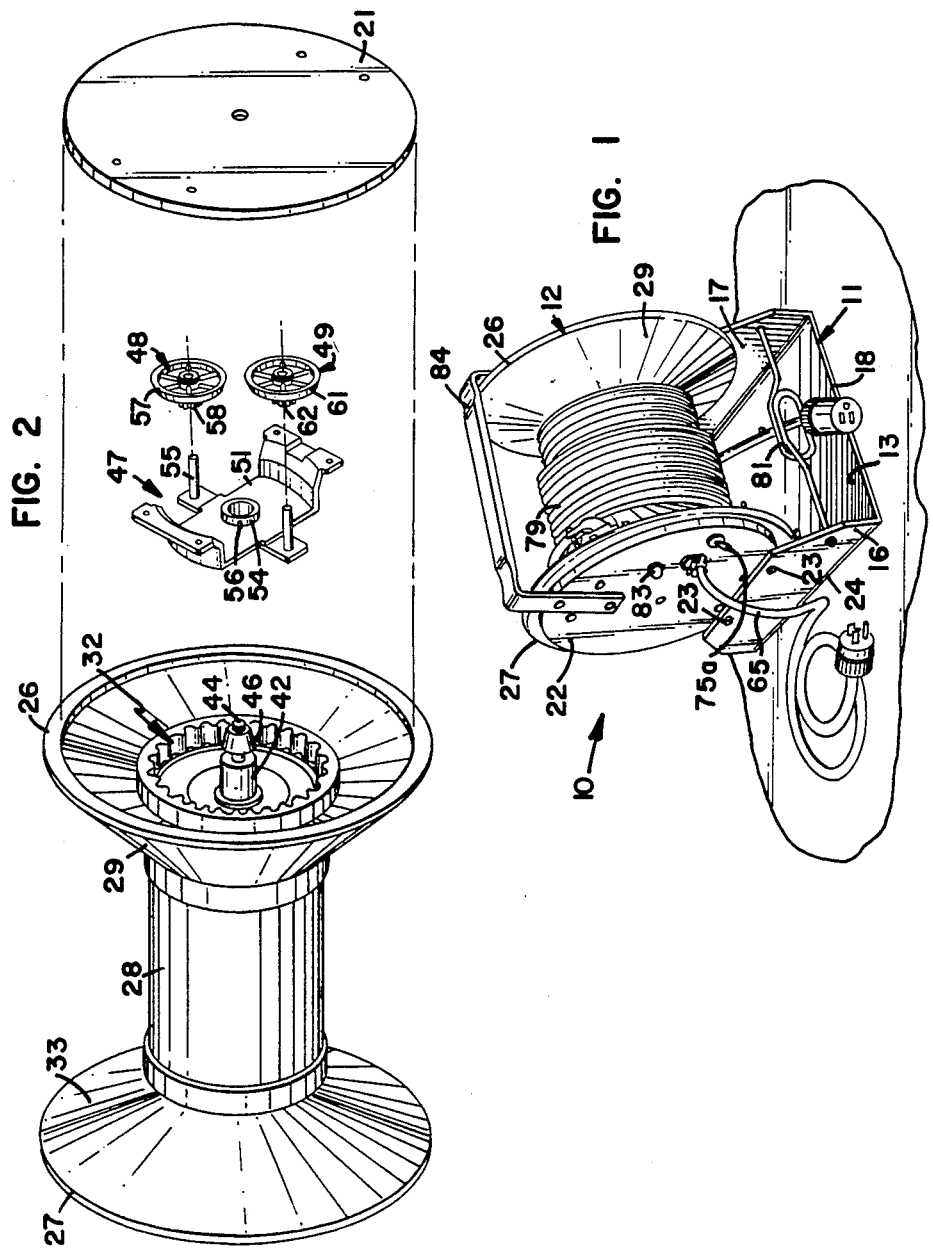

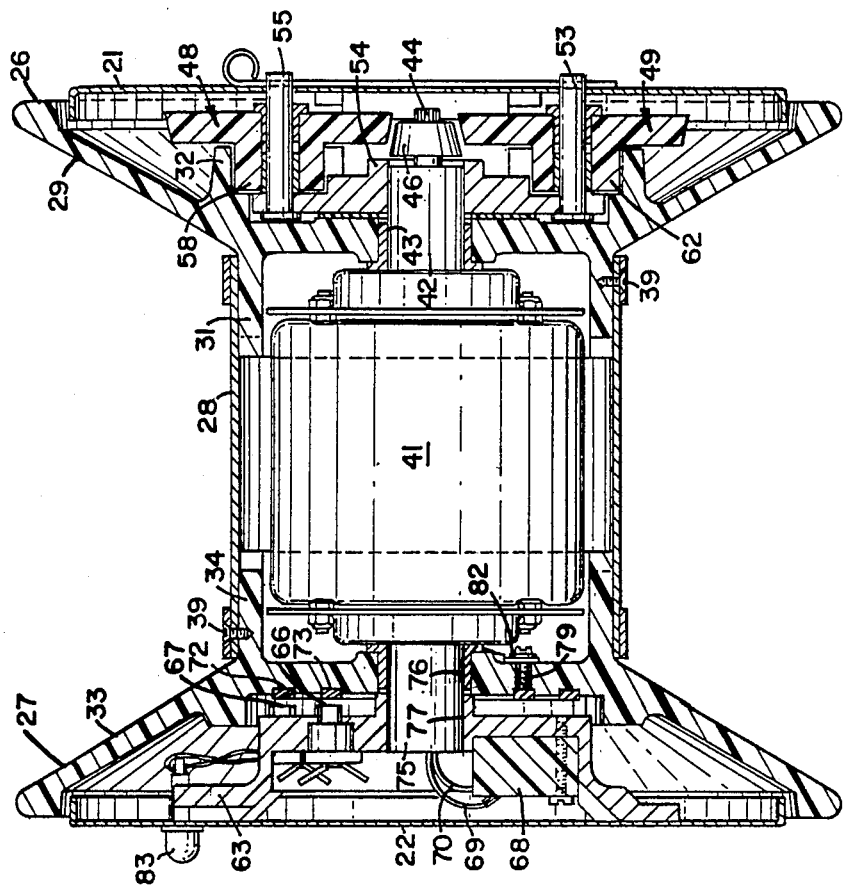
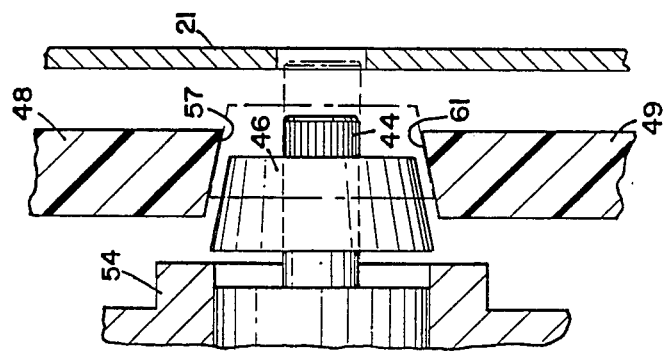
FIG. 4
FIG. 5

RETRIEVABLE ELECTRIC CORD REEL

FIELD OF THE INVENTION

The present invention relates to apparatus for storing electrical cord and more particularly to powered apparatus for winding extension cord on a reel and supplying electrical power to machines operating from such a cord.

BACKGROUND OF THE INVENTION

Storage of electrical cords such as extension cords is a problem of long standing. Most persons have experienced the frustration of tangled extension cords resulting in safety hazards. A variety of attempts have been made in the past to eliminate this problem. Many of such attempts have met with at least partial success; however, certain inherent problems remain. For example, winding an extension cord onto a reel by hand is bothersome and time consuming. Such existing reels are not capable of supplying current during wrapping and unwrapping of cord from the reel. In the case of large, heavy industrial cords, substantial physical effort is required. Efforts have been made to mechanize the winding of extension cord on reels. For example, one device in common use includes a rotatable reel mounted on a carriage. The rotatable reel has a crank-like handle providing a degree of mechanical advantage to the user. Such a device also has been powered by an electric motor. Such powered reels have, in the past, been cumbersome in size and have had the further disadvantage of required operator attendance at the reel to provide operation. It has been estimated that an operator of industrial cleaning equipment may lose as much as 72 minutes each day due to untangling and winding cord by hand. This lost time can be saved using the present invention.

GENERAL DESCRIPTION OF THE INVENTION

The present invention provides a compact powered reel including a base which, if desired, may be pivotally mounted. The base includes a pair of sidewalls between which is mounted a rotatable reel. An electric motor is mounted in the hub of the reel to provide a rotatable drive between the reel and the base.

The present powered reel may include control switching which permits remote actuation of the electric motor. In one embodiment, the operator manipulates a mechanical switch which feeds a microcurrent to a control switch mounted in the reel. In another embodiment, a radio-control unit transmitter is used to actuate the electrical switch with the switch and receiver being mounted in the reel.

BRIEF DESCRIPTION OF THE DRAWINGS

In the drawings:

FIG. I is a perspective view of one embodiment of the present invention;

Figure 3:
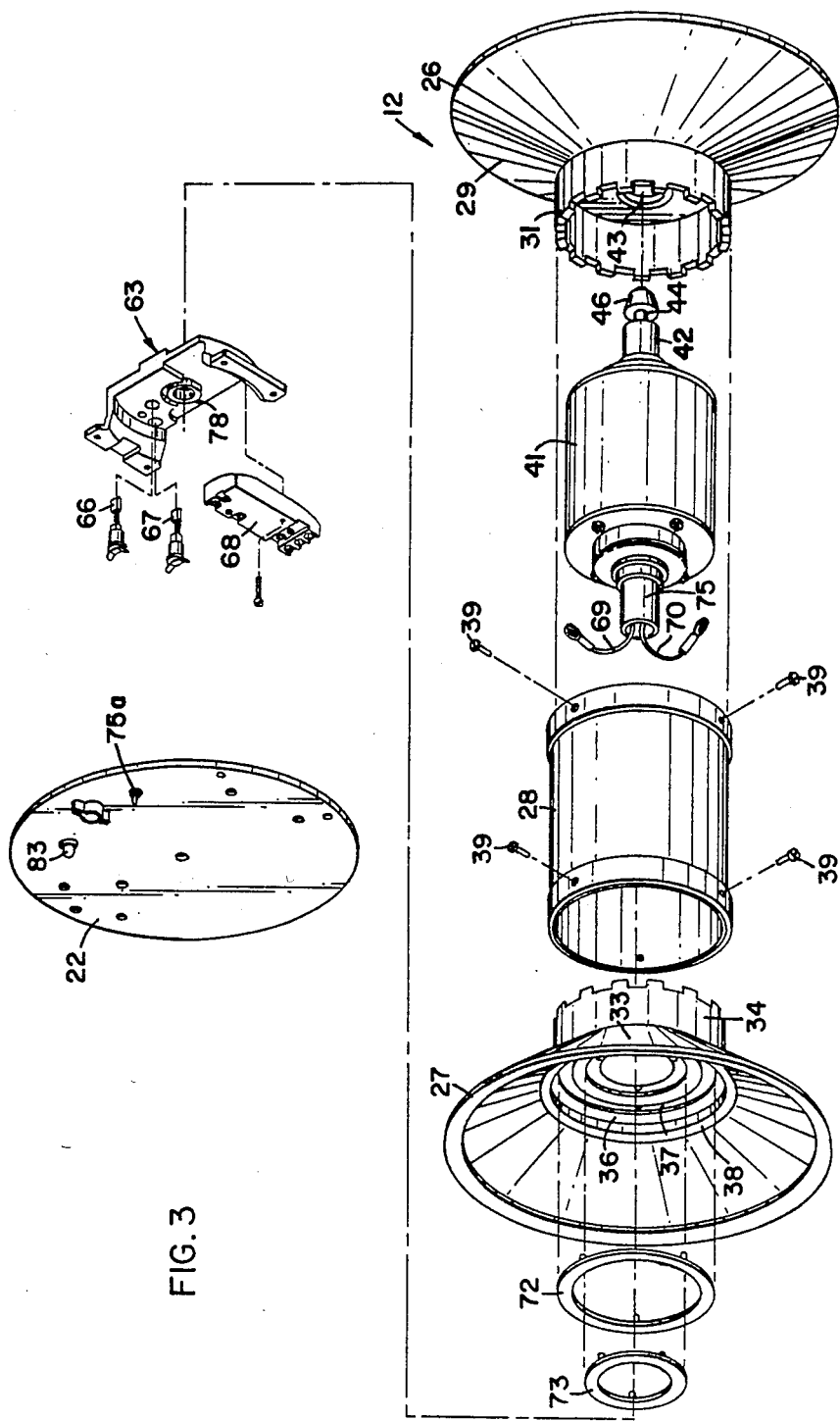

FIG. II is an exploded perspective view showing the drive mechanism of the present invention;

FIG. III is an exploded perspective view of the reel showing the motor and electrical system of the present invention;

FIG. IV is a cross-sectional view taken generally through the center of the reel of the present invention; and FIG. V is an enlarged fragmentary view of a portion of the drive.

DETAILED DESCRIPTION OF THE INVENTION

The retractable electric cord reel 10 of the present invention, one embodiment of which is illustrated in FIGS. 1–5, may include a base 11 and a rotatable reel 12 supported on base 11. The base 11 may be formed from sheet metal and is illustrated in FIG. 1 including a first member 13 with a pair of upturned end portions 16 and 17 interconnected by a center portion 18. The base 11 further includes a pair of end plates 21 and 22 which are secured to the end portions 16 and 17 such as by bolts 23. The base 11, if desired, may also include a swivel plate 24 which permits the retractable reel to always face toward the direction from which the extension cord is coming. The swivel plate 24 may be of conventional construction and therefore is not described in detail herein. In fact, such swivel plates are commercially available.

The reel 12 (FIGS. 2–4) may include a pair of end portions 26 and 27 and a central hub 28. The reel 12 may be of a water resistant material. The reel 12 may be oversized to accommodate excess cord. The end member 26 may have a frustuconical portion 29 and a tubular portion 31. The frustuconical portion 29 includes an integral internally-toothed portion 32 for purposes hereinafter described. The end member 27 likewise has a frustuconical portion 33 and a cylindrical portion 34. The frustuconical portion 33 has a pair of channels 36 and 37 defined in the outwardly-facing wall surface 38 for purposes hereinafter described. The cylindrical portions 31 and 34 are sized to be snuggly received within the hub 28 and may be secured therein such as by screws 39.

The reel 12 includes an electric motor 41 which is mounted in the hub 28. The motor 41 is supported by a pair of brackets 47 and 63 hereinafter described. The cylindrical portions 31 and 34 may include toothed outer ends. The motor 41 has an elongated cylindrical housing portion 42 which extends through an opening 43 defined in end member 26. The motor further includes a shaft 44 and a drive wheel 46, as illustrated in FIG. 4. The drive wheel 46 may be tapered as illustrated in FIG. 5 for purposes hereinafter described. The end plates 21 and 22 may be spaced from the reel end portions 26 and 27 to provide air passage therebetween for cooling the motor 41.

The drive portion of the present invention is illustrated in FIG. 2. The drive includes a gear-support bracket 47 and at least one and preferably a pair of frictional drive gears 48 and 49 mounted thereon. The gear support bracket 47 may, for example, be cast of metal or metal stamping and has a U-shaped portion 51, which may be suitably bolted to the end plate 21. The bracket 47 further includes a cross member 52 on which is mounted a pair of stub shafts 53 and 55 which rotatably support the frictional drive gears 48 and 49. The U-shaped portion 51 may include a short integral cylindrical portion 54 with a set screw 56. The frictional gear 48 includes a first tapered portion 57 designed for frictional engagement with the tapered drive wheel 46 and a second toothed portion 58 which mates with and drives the toothed portion 32 of member 26. The gear 48 is rotatably mounted on stub shaft 55. Likewise, gear 49 includes a tapered friction portion 61 and a toothed portion 62 for engagement with the tapered drive wheel 46 and toothed portion 32 respectively.

The electrical system of the present invention is illustrated in FIGS. 3 and 4. A mounting bracket 63 is secured to the end plate 22 such as by bolts. The bracket 63 supports a pair of brushes 66 and 67 and a control switch 68. The control switch 68 is connected to a power source by way of cord 65 and to the electrical wires 69 and 70 from the motor 41. The control switch 68 may be of the type disclosed in U.S. Pat. No. 3,602,728 and controlled by a microcurrent applied through the ground wire of the extension cord. The microcurrent is controlled by a switch on the extension cord. Alternatively, the on-off control of motor 41 may be the switching controls commonly used on automated garage doors. A hand-held radio transmitter may be carried by the operator or stored in a suitable pouch on the reel 12. The transmitter may be coded so that a plurality of units 10 may be independantly operated in the same general area. Desirably, an on-off switch is provided as a momentary switch 75a on the side of the unit 10 so that the motor can be activated adjacent the unit.

A pair of contact rings 72 and 73 are mounted in the channels 36 and 37 of end member 27. The brushes 66 and 67 mate with the contact rings 72 and 73, respectively, to provide for transmission of electrical current from a wire extending through the end plate 27 to the cord 74 contained on the rotatable reel 12. The motor 41 includes a cylindrical portion 75 which extends through the opening 76 in member 27 and opening 77 in support bracket 63. A set screw 78 locks the motor housing with respect to the mounting bracket 63.

As illustrated in FIG. 1, an extension cord 74 may be disposed on the reel 12. A limit device 81 may be provided to stop the rotation of the reel once the cord has been wrapped on the reel. The cord reel 10 may have a carrying handle 84.

OPERATION OF THE INVENTION

Although the operation of the present invention would be apparent from the preceeding disclosure, it will be further described hereinafter in order to provide a more complete understanding of the invention.

Use of the present retractable electric cord reel usually commences with the cord positioned as illustrated in FIG. 1. The operator may grasp the end of the extension cord and pull until a sufficient amount of extension cord has been stripped from the reel. While the operator is pulling on the cord, the reel 12 rotates in a free-wheeling mode as illustrated in FIG. 4 and the enlarged view, FIG. 5. The drive wheel 46 is in a retracted position, providing a slight clearance between such drive wheel and the frictional drive gears 48 and 49. The reel 12 rotates freely with respect to the base 11 and the motor 41. This rotatable action finds the gears 48 and 49 rotating on the stub shafts 53 and 55 and the reel 12 riding along the toothed portions of such gears. The opposite end of the reel finds the member 27 rotating on the motor housing portion 54, which is in turn supported by the bracket 63.

The cord 65 is plugged into an electrical outlet and current is fed to the brushes 66 and 67 which in turn feeds current to the contact rings 72 and 73. The contact rings 72 and 73 are electrically connected to the extension cord 79 such as by brushes 66, 67 and screws 82. The cord 65 is also connected to the control switch 68 which in turn is connected to the motor 41.

Actuation of the switch 68 feeds current to the motor 41, thus rotating the drive wheel 46. When current is fed to the motor, thrust of perhaps 50 to 70 ounce-inches is provided causing the shaft of the motor 41 to move rightwardly as viewed in FIGS. 4 and 5, thereby providing frictional engagement between the wheel 46 and the tapered portions 57 and 61 of the gears 48 and 49 respectively. The thrust is actually caused by the motor's rotor seeking to center itself due to magnetic forces. The tapered surfaces of drive wheel 46 and portions 57, 61 cause displacement of the motor's rotor and thus disengagement of the driving force between wheel 46 and portions 57, 61. The flat portions 57 and 61 may be surfaced with a grit to provide traction when engaged with drive wheel 46. The drive ratio and the rotatable speed of the motor 41 are matched to provide a relatively slow rotation of the reel 12 so that there is no jerking of the cord. Once the extension cord 74 is again wrapped on the reel as illustrated in FIG. 1, resistance is provided by limit device 81 and slippage occurs between the drive wheel 46 and the gears 48 and 49. The swivel plate 24 facilitates uniform distribution of the cord on the reel 12 by permitting the reel 12 to move side to side.

While a specific embodiment of the present invention has been disclosed, it is to be recognized that numerous modifications may be made to the present invention without departing from the broader scope of the present invention. For example, it is contemplated that the present retractable electrical cord reel may be a free-standing unit as illustrated in FIG. 1 or may alternatively by mounted in power equipment such as a scrubbing machine, sweeping machine or the like. The unit 10 may be provided with a safety light 83 which signals if there is a fault or irregularity in the power source connections e.g., reversal of power and ground wires.

What is claimed is:

1. A retractable electric cord reel comprising a base, a rotatable reel supported on said base and a motor for providing a rotatable drive between said base and said reel, said motor including means to thrust the drive shaft outwardly into engagement with said drive gears upon actuating said motor, said base including a pair of upstanding end walls, said rotatable reel being disposed between said end walls, a pair of support brackets, one of said support brackets being secured to a first of said upstanding end walls, said one bracket carrying at least a pair of rotatable drive gears for drivingly supporting a first end of said reel, said one bracket further including means for supporting a first end of said motor, the second of said support brackets being secured to the other of said end walls, said second bracket including means for transmitting electric current across the rotating interface between said base and said reel thereby providing current to cord on said reel, said second bracket including means to support said reel and the second end of said motor.

2. A retractable electric cord reel comprising a base, a rotatable reel supported on said base and a motor including a drive shaft for providing a rotatable drive between said base and said reel, said base including a pair of upstanding end walls, said rotatable reel being disposed between said end walls, a pair of support brackets, one of said support brackets being secured to a first of said upstanding end walls, said one bracket carrying at least a pair of rotatable drive gears for drivingly supporting a first end of said reel, said one bracket further including means for supporting a first end of said motor, the second of said support brackets being secured to the other of said end walls, said second bracket including means for transmitting electric current across the rotating interface between said base and said reel thereby providing current to cord on said reel, said second bracket including means to support said reel and the second end of said motor, said motor including means to thrust the drive shaft outwardly into engagement with said drive gears upon actuating said motor, said drive shaft carrying a tapered cone and said drive gears carrying a tapered circumferential portion for mating with said tapered cone, and wherein said means to thrust said drive shaft includes the armature of said motor.

3. The cord reel of claim 2 wherein said drive shaft tapered cone and said tapered circumferential portion serve as a slip clutch.

4. The cord reel of claim 2 wherein said thrust means include means for disengaging said tapered cone from said tapered circumferential portion, thereby providing said reel with a free wheeling mode.

5. The cord reel of claim 2 wherein said base includes means to swivel said rotatable reel with respect to a supporting surface, thereby providing uniform distribution of cord along said rotatable reel.

6. The cord reel of claim 2 wherein said end walls are spaced from said rotatable reel to permit escape of heat from said motor.

7. The cord reel of claim 2 wherein one of said end walls carries a momentary switch for selectively placing said motor in an operative or inoperative mode.

8. The cord reel of claim 2 wherein said rotatable reel carries an electrical cord and wherein said electrical cord has an outer end with a momentary switch for selectively placing said motor in an operative or an inoperative mode.

9. The cord reel of claim 2 or 7 wherein said cord reel includes a wireless remote control for selectively placing said motor in an operative or an inoperative mode.

10. A retractable electric cord reel comprising a base, an electric cord spool rotatably supported on said base, electric cord carried by said spool, an electrically-driven motor mounted within said spool, drive means associated with said motor to provide free-wheeling operation during stripping of said electric cord from said reel and rotatably-driven engagement between said spool and said base during retraction of said cord onto said spool, and control means for selectively operating said motor to retract electric cord onto said spool, said reel including engagement means for engaging and disengaging said drive means, said engagement means comprising a thrust drive, whereby said reel has a driven mode for retracting electric cord onto said spool and a free-wheeling mode to permit stripping of electric cord from said spool.

11. A retractable electric cord reel comprising a base, an electric cord spool rotatably supported on said base, electric cord carried by said spool, an electrically-driven motor mounted within said spool, drive means associated with said motor to provide free-wheeling operation during stripping of said electric cord from said reel and rotatably-driven engagement between said spool and said base during retraction of said cord onto said spool, and control means for selectively operating said motor to retract electric cord onto said spool, said control means comprising a portable signal transmitter and a signal-activated electrical switch, said switch being mounted on said reel to control the electrical current to said motor, said reel including engagement means for engaging and disengaging said drive means, said engagement means comprising a thrust drive, whereby said reel has a driven mode for retracting electric cord onto said spool and a free-wheeling mode to permit stripping of electric cord from said spool.

12. A retractable electric cord reel comprising a base, an electric cord spool rotatably supported on said base, electric cord carried by said spool, an electrically-driven motor mounted within said spool, drive means associated with said motor to provide free-wheeling operation during stripping of said electric cord from said reel and rotatably-driven engagement between said spool and said base during retraction of said cord onto said spool, and control means for selectively operating said motor to retract electric cord onto said spool, said reel including engagement means for engaging and disengaging said drive means, said engagement means comprising a thrust drive whereby said reel has a driven mode for retracting electric cord onto said spool and a free-wheeling mode to permit stripping of electric cord from said spool, said control means comprise first switch means mounted on the outer end of said electric cord and second switch means mounted on said reel, said first switch means controlling microcurrent to said second switch means thereby placing said second switch selectively in an activated or an inactivated condition, said second switch serving to control the electrical current to said motor.

* * * * *